W. A. BLIZZARD.
PLOW.
APPLICATION FILED JAN. 22, 1910.
973,745.
Patented Oct. 25, 1910.
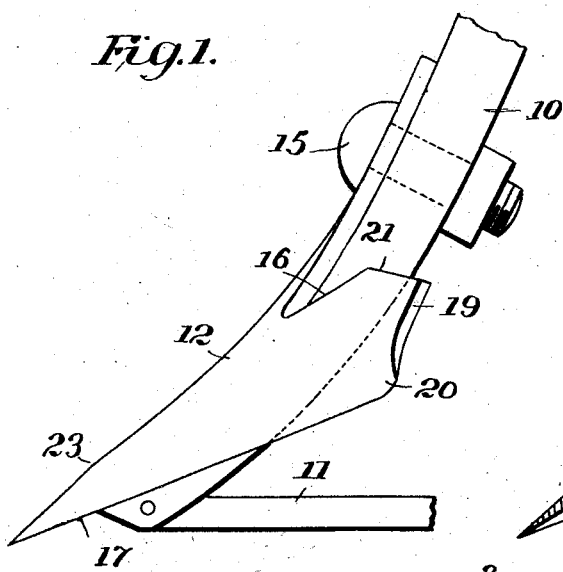
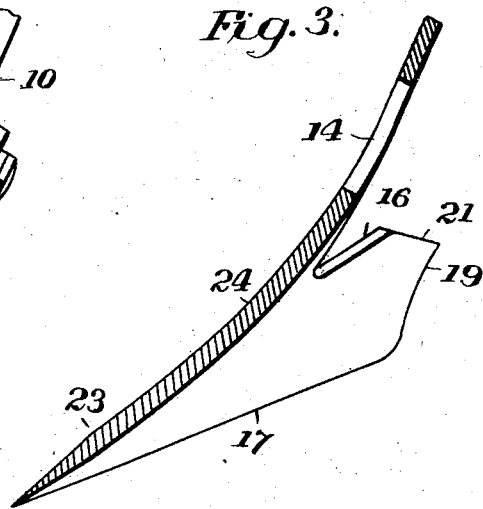
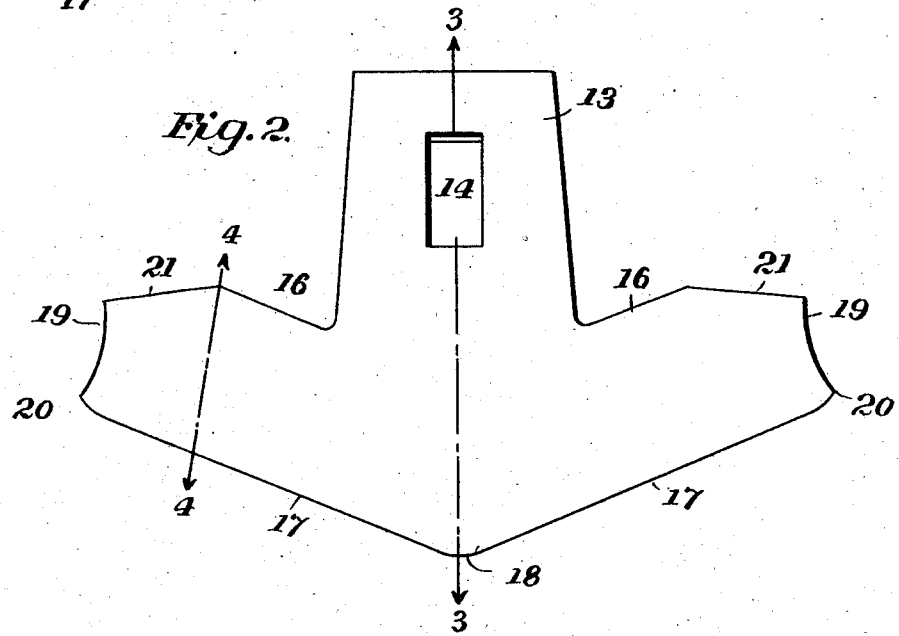
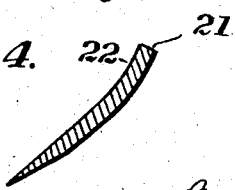
Witnesses
J. G. Hinkel
J. H. Bruninga.
Inventor
William A. Blizzard
By Foster Freeman Watson Coit
Attorneys

UNITED STATES PATENT OFFICE.

WILLIAM A. BLIZZARD, OF DILLON, SOUTH CAROLINA, ASSIGNOR TO DILLON PLOW & NOVELTY WORKS, OF DILLON, SOUTH CAROLINA, A CORPORATION OF SOUTH CAROLINA.

PLOW.

973,745.  Specification of Letters Patent.  Patented Oct. 25, 1910.

Application filed January 22, 1910. Serial No. 539,590.

*To all whom it may concern:*

Be it known that I, WILLIAM A. BLIZZARD, a citizen of the United States, and resident of Dillon, county of Marion, State of South Carolina, have invented certain new and useful Improvements in Plows, of which the following is a specification.

This invention relates to plows, and more particularly to plows which are used for cultivating purposes.

The object of this invention is to construct a plow which will efficiently cultivate and break up the ground.

The invention will be described in connection with the accompanying drawings, in which—

Figure 1 is a side view of the plow sweep attached to the stock; Fig. 2 is a front view of the sweep; Fig. 3 is a section on the line 3—3 Fig. 2; and Fig. 4 is a section on the line 4—4 Fig. 2.

Referring to the drawings, 10 designates a plow stock, which may be an upright stock of well known construction provided with the usual foot piece 11, which forms the bearing on which the plow runs. A plow sweep 12 is provided with a shank 13, which has formed therein an elongated slot 14 arranged to receive a bolt 15, by means of which the sweep can be adjustably secured to the stock.

The sweep has formed thereon a pair of outwardly and rearwardly extending wings 16, the lower edges 17 forming a forwardly projecting point 18. The wings terminate rearwardly in substantially vertically arranged edges 19 which flare outwardly and terminate in sharp corners 20. The lower edges 17 are sharpened from the point 18 to the edges 19, as shown in the figures. The wings also terminate rearwardly in substantially horizontally arranged edges 21, and the rear portions of the wings are concave and slightly turned over at 22, as shown in Fig. 4. The point 18 is arranged so as to project downwardly slightly, as shown at 23 in Figs. 1 and 2, and the sweep rearwardly of the point is concave, as shown at 24.

By means of the slotted connection of the sweep to the stock the depth of the cut may be readily adjusted. The construction of the point and the concave construction in the center at 24 allows the sweep to start into the ground easily. The sharp corners 20 and parts of the edges 19 run under the ground next to the growing stuff and these outwardly projecting corners pulverize the ground. The turns 22 in the wings place the dirt properly back over where the corners cut under and leave it in proper shape. The edges 21 are cut off and shaped so that a certain amount of dirt may fall back over the corners of the sweep, and yet not enough to cover the small crop. The sharp edges 17 allow the plow to cut through the ground easily and the amount of dirt which is thrown out may be readily adjusted by the slotted connection.

It is obvious that various changes may be made in the details of construction without departing from this invention, and it is, therefore, to be understood that this invention is not to be limited to the specific construction shown and described.

Having thus described the invention, what is claimed is:

A plow sweep having a pair of wings extending outwardly upwardly and rearwardly forming a forwardly projecting point, the wings terminating rearwardly in substantially vertically arranged edges which flare outwardly, said edges terminating in sharp corners which run under the ground and pulverize the same, and said wings terminating rearwardly in substantially horizontally arranged edges, said wings being concave and turned over at said horizontally arranged edges, the lower edges of said wings from the point to said rear sharp corners being sharpened, for the purpose set forth.

In testimony whereof I affix my signature in presence of two witnesses.

WILLIAM A. BLIZZARD.

Witnesses:
O. F. MOODY,
E. H. KING.